United States Patent [19]

Sharples

[11] Patent Number: 5,702,623
[45] Date of Patent: Dec. 30, 1997

[54] HEATING APPARATUS

[75] Inventor: James Henry Sharples, Radcliffe, United Kingdom

[73] Assignee: Pifco Limited, Manchester, United Kingdom

[21] Appl. No.: 498,616

[22] Filed: Jul. 6, 1995

[30]  Foreign Application Priority Data

Jul. 7, 1994 [GB] United Kingdom ............... 9413661

[51] Int. Cl.$^6$ ............... F27D 11/02; H05B 3/82
[52] U.S. Cl. ............... 219/436; 219/430; 392/444
[58] Field of Search ............... 219/385, 386, 219/387, 429, 436, 438, 430, 455, 457, 450; 392/441, 444

[56]  References Cited

U.S. PATENT DOCUMENTS

| | | |
|---|---|---|
| 4,310,748 | 1/1982 | Paulin . |
| 4,621,186 | 11/1986 | Taylor et al. ............... 219/441 |
| 5,138,938 | 8/1992 | McClean ............... 219/385 |
| 5,176,856 | 1/1993 | Takahashi et al. ............... 392/441 |
| 5,506,931 | 4/1996 | Leon ............... 392/441 |

FOREIGN PATENT DOCUMENTS

| | | |
|---|---|---|
| 1142988 | 3/1983 | Canada . |
| 2443500 | 4/1976 | Germany . |

Primary Examiner—Teresa J. Walberg
Assistant Examiner—J. Pelham
Attorney, Agent, or Firm—Harrison & Egbert

[57]  ABSTRACT

A method for attaching a planar electrical element (5), such as a thick film printed circuit, to a vessel (1) whereby the element (5) is integrated in the body of the vessel (1) to form a heating apparatus such as an electric kettle. The vessel (1) defines an aperture (4) at a position where the element (5) is to be secured thereto and the element (5) includes a plate capable of covering the aperture (4). The element (5) is retained in position covering the aperture (4) by subsequent deformation of the body of the vessel. In the method, a sealing member (7, 11, 12, 13) is located between the periphery of the aperture (4) and the element (5) and a securing member (6) is positioned on the element (5) on the opposite side to the sealing member (7, 11, 12, 13). The securing member (6) is retained in position, with the element (5) in contact with and compressing the sealing member (7, 11, 12, 13) by a predetermined amount whilst the body of the vessel (1) is deformed, such as by heat forming, in a region (9, 15) around the aperture (4). The element (5) is thereby retained in position with the sealing member (7, 11, 12, 13) under compression.

16 Claims, 2 Drawing Sheets

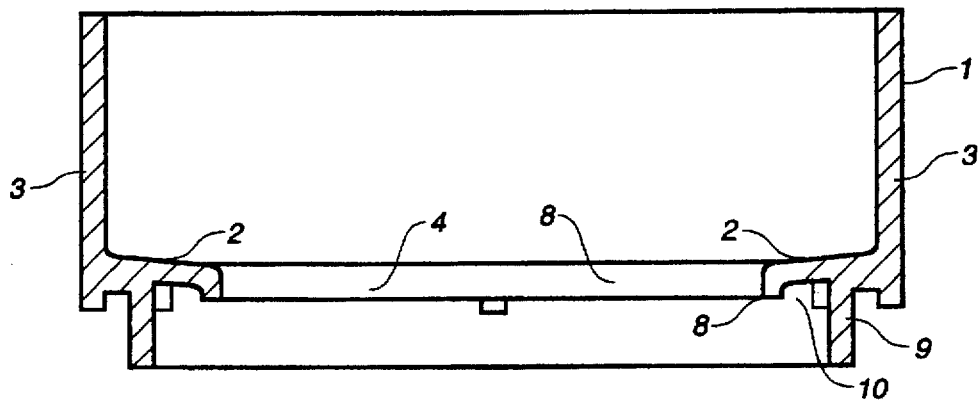
FIG. 1
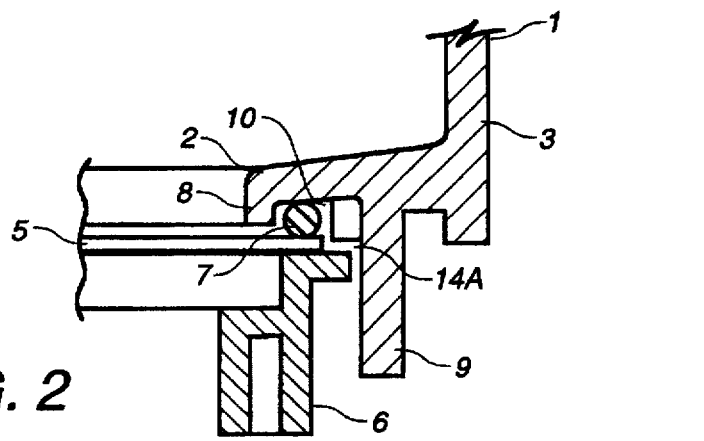
FIG. 2
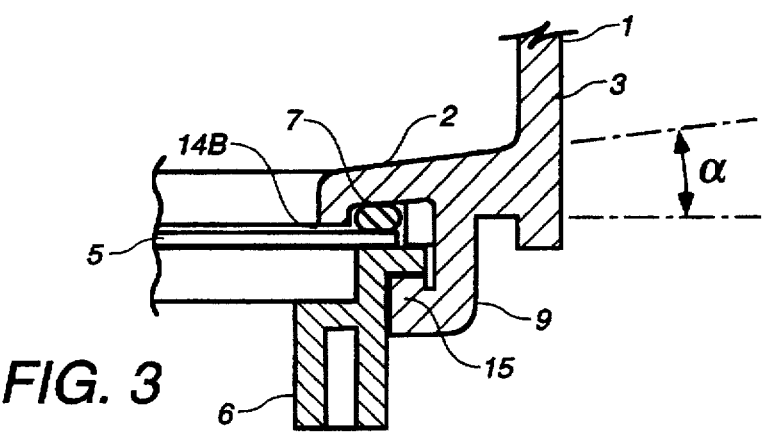
FIG. 3
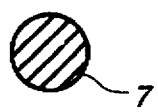   
FIG. 4A   FIG. 4B   FIG. 4C   FIG. 4D

HEATING APPARATUS

TECHNICAL FIELD

The present invention relates to heating apparatus incorporating an electrical element and in particular to but not exclusively to water heating apparatus such as an electrical kettle.

BACKGROUND ART

Conventionally, an electric kettle comprises a vessel in a lower portion of which a sheathed coiled wire electrical element is located. The element and accompanying electrical control circuitry are usually mounted on a side or base wall of the vessel. Typically the element passes through an aperture in the side wall and projects into the vessel. Suitable sealing means are used to ensure a water-tight joint between the element and the wall of the vessel to prevent leakage of water in use.

A disadvantage of such an arrangement is that in order to prevent the element from overheating in use it is essential that the element is completely covered by water. This renders the kettle inefficient when only small quantities of heated water are required. In addition, such elements are themselves inefficient when compared with more modern planar elements which, for example, are faster acting, quieter in use and resistant to limescale.

However, whilst planar elements such as those comprising thick film printed circuits have been used in various electrical apparatus in the past, difficulties arise where the apparatus comprises a vessel which may be made of a plastics material that would be damaged by use of the element if it were to be placed in direct contact with the vessel itself. For example, domestic kettles now have bodies made of polypropylene or similar plastics materials which would be unable to withstand the element temperatures required during normal operation to boil water without sustaining considerable damage were the element to be placed in direct contact therewith.

One of the objects of the present invention is, therefore, to provide a method whereby a planar electrical element such as one of a thick film printed circuit type can be integrated in the body of a heating apparatus, such as a plastics kettle, and thus produce an apparatus which overcomes or substantially mitigates the aforementioned disadvantages.

SUMMARY OF THE INVENTION

According to a first aspect of the present invention there is provided a method of attaching a planar electrical element to a vessel whereby the element is integrated in the body of the vessel to form a heating apparatus, the vessel defining an aperture at a position where the element is to be secured thereto and the element comprising a plate capable of covering the aperture, the method comprising the steps of locating a sealing means around the periphery of the aperture; locating the element on the sealing means to cover the aperture; positioning a securing member on the element on the opposite side thereof to the sealing means; retaining the element and the securing means in position with the element in contact with the sealing means whilst compressing the sealing means by a predetermined amount; and deforming the body of the vessel in a region around said aperture to retain the securing means and thereby the element and the sealing means in place with the sealing means under compression.

Preferably, the body of the vessel is deformed by the application of heat to a portion of the body around the periphery of the aperture.

Preferably also, the body of the vessel comprises a projecting collar around the periphery of the aperture which is deformed by being turned over inwardly of the aperture under the application of heat to come into contact with the securing means to retain the securing means and thereby the element and the sealing means in place with the sealing means under compression.

Preferably also, the element and the securing means are retained in position with the element in contact with the sealing means whilst the sealing means is compressed, by supporting the securing means in contact with the element and applying a negative pressure to the interior of the vessel.

Preferably also, the negative pressure is sufficient to compress the sealing means by the predetermined amount required.

Alternatively, the element and the securing means are retained in position with the element in contact with the sealing means whilst the sealing means is compressed, by the application of pressure to the securing means.

Preferably also, the securing means comprises an annulus.

Preferably also, the annulus comprises at least one thermoplastic clip for the attachment of a thermal switch thereto whereby in use at least part the thermal switch is held in contact with the element.

Preferably also, the sealing means comprises silicone rubber seal which is compressed by at least 30%.

According to a second aspect of the present invention there is provided a heating apparatus comprising a vessel for heating liquid and a planar electrical element integrated in the body of the vessel, the element covering an aperture defined in the body of the vessel and being retained in position by deformation of the body of the vessel in a region around said aperture.

Preferably, a sealing means is located around the aperture between the element and the body of the vessel.

Preferably also, a securing means is provided located in contact with the element on the opposite side thereof to the sealing means and against which the deformed portion of the body bears.

Preferably also, the body of the vessel comprises a projecting collar around the periphery of the aperture which has been deformed by being turned over inwardly of the aperture to retain the element in place.

Preferably also, the projecting collar of the vessel is turned over into contact with the securing means to retain the element and the sealing means in place.

Preferably also, the sealing means is retained in position under compression.

Preferably also, the heating apparatus comprises a kettle with a body made of a plastics material, the base wall of the vessel surrounding the element being inclined towards the element so that any liquid retained in the vessel is directed on to the element.

Preferably also, the base wall of the vessel surrounding the element is inclined towards the element at an angle in the range 5° to 10° inclusive.

Preferably also, the element is stopped downwards from the base wall of the vessel to form a well in which liquid can be retained in direct contact with the element.

BRIEF DESCRIPTION OF THE DRAWINGS

The various aspects of the present invention will now be described by way of example with reference to the accompanying drawings, in which:

FIGS. 1, 2 and 3 are schematic vertical cross-sections of a lower portion of a vessel for heating liquid showing in sequence three stages in the method according to the first aspect of the present invention, FIG. 1 comprising a cross-section of the whole lower portion of the vessel whereas FIGS. 2 and 3 are each enlarged views of only one side of the vessel;

FIGS. 4a, 4b, 4c and 4d show in transverse cross-section to an enlarged scale four seals, each of which can be substituted for the others in the first and second aspects of the invention;

DETAILED DESCRIPTION OF THE PRESENT INVENTION

Figure 5:
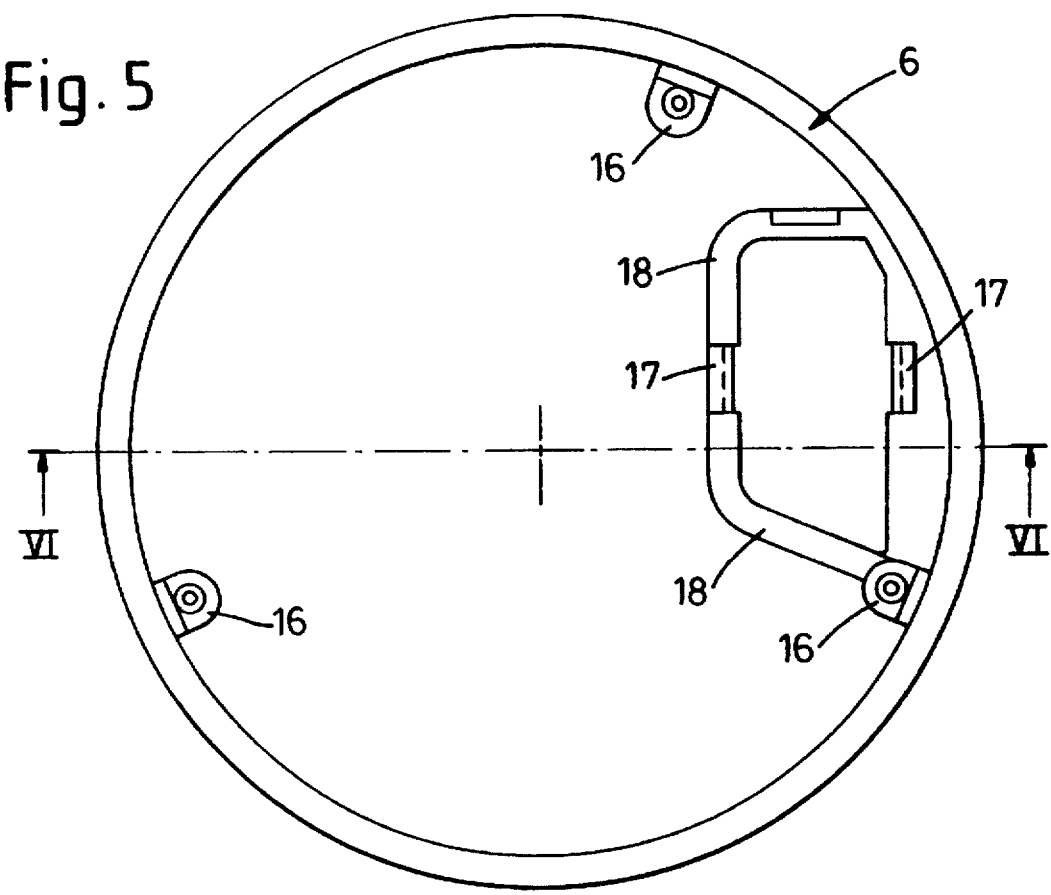
FIG. 5 is a view from below of an annulus as shown to a reduced scale in FIG. 1.

Referring firstly to FIGS 1 and 4, a heating apparatus for liquids, such as a domestic kettle, comprises a vessel 1 having a base wall 2 and a side wall 3. The base wall 2 defines an aperture 4 which is intended to be covered by a planar electrical element 5, as indicated in FIGS. 2 and 3, that after attachment to the vessel is integrated into the body of the vessel 1 to make it entire and capable of being used for heating liquids.

Figure 6:
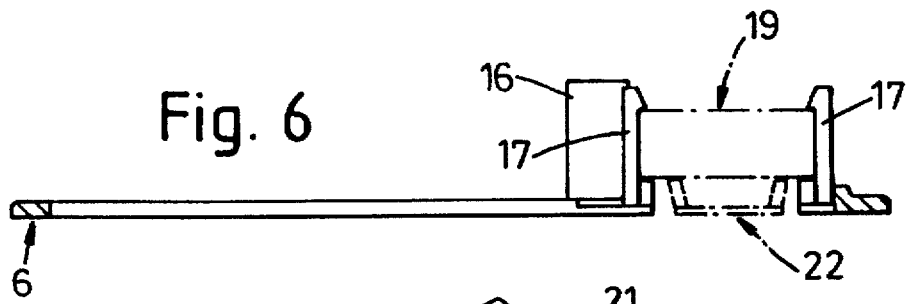
FIG. 6 is a cross-section along the line VI—VI in FIG. 5 and additionally shows in chain dashed lines the location of a control means for use therewith.

The element 5 is held in place by means of a securing means in the form of an annulus 6, as shown in more detail in FIGS. 5 and 6. The annular form of the securing means enables an air space to be left below the element 5 to insulate other components of the heating apparatus from the element 5. In addition to its retaining function, the annulus 6 serves to stiffen the base wall 2 of the kettle which supports the element 5 and also fulfils a number of other important functions which are described in more detail below.

A sealing means is also used in the securement of the element 5 to the vessel 1 to ensure a water-tight joint. As is described in more detail below, the sealing means may take the form of a seal 7, as shown in FIGS. 2 and 3 and in enlarged transverse cross section in FIG. 4a, or may take the form of one of the other three seals 11, 12 and 13 as shown in FIGS. 4b, 4c and 4d respectively.

The method of securing the element 5 to the vessel 1 will now be described with reference to FIGS. 1 to 3 assuming the seal 7 to be the sealing means used.

As shown in FIG. 1, the base of the vessel 1 defining the aperture 4 is shaped so as to provide a downwardly projecting lip 8 around the periphery of the aperture 4 and a longer downwardly projecting collar 9 between which is located a seating 10 for the seal 7. The relative dimensions of the lip 8, collar 9, element 5 and annulus 6 are such that the annulus 6 has a greater outside diameter than that of the element 5 but both of them have small diameters than the inner diameter of the collar 9. Thus, as shown in FIG. 2, the element 5 and the annulus 6 can be located within the collar 9.

In the method, the seal 7 is located in the seating 10 and the element 5 is centered on the aperture 4 to lie covering the sealing means 7 without touching the base or side wall 2, 3 of the vessel 1. The annulus 6 is then centered over the element 5 and places in contact with the element 5 on the other side to the seal 7 and exterior to the vessel 1, as shown in FIG. 2. To assist in the centering of the element 5 and the annulus 6, appropriately located pips or tabs (not shown) can be provided on the body of the vessel 1 or annulus 6 itself.

The sealing mean can comprise a pre-formed strip or ring in the correct dimensions to be located in the seating 10 or be formed in situ from a liquid, paste or foam. If pre-formed, the sealing means can take the form of an O-ring, such as the seal 7, or comprise a rectangular-section annular or strip seal 11, as shown in FIG. 4b. If formed in situ, the sealing means can take the form of the part-circular foam seal 12 as shown in FIG. 4c. The sealing means can also take the form of a C-section gasket 13, such as that shown in FIG. 4d, which fits around the rim of the element 5. In this last case, only part of the gasket 13 fits into the seating 10, the other part wraps around the element 5 and is covered by annulus 6.

With the annular, strip and foam seals 7, 11 and 12, an air gap 14A is left between the outer edge of the element 5 and the inner surface of the collar 9. This gap permits the element 5 to expand in use without touching the vessel 1. However, if the gasket seal 13 is used, the seal 13 touches the inner face of the collar 9 and is compressed when the element 5 expands laterally.

Once the assembly as shown in FIG. 2 has been made, the seal 7, the element 5 and the annulus 6 are held in position whilst the seal is compressed by a predetermined amount, which is preferably between 30% and 40% of its original diameter. The compression is preferably carried out by applying a negative pressure to the interior of the vessel 1 which has the added advantage of enabling the seal 7 to be leak tested at the same time. Alternatively, the compression can be effected by the application of external pressure to the annulus 6.

It is important to note, however, that a small air gap 14B is left between the surface of the element 5 and the downwardly projecting lip 8.

Whilst under compression, heat is applied to the collar 9 so that it can be deformed and turned over by a mandrel or similar apparatus into contact with the annulus 6, as shown in FIG. 3. The turned over portion 15 of the collar 9 retains the element 5 in position and the seal 7 under compression via the annulus 6 to ensure a water- and air-tight joint.

As the annulus 6 is located between the deformed portion 15 of the collar 9 and the element 5, it also serves as a heat shield to isolate the body of the vessel 1 from the element 5. Similarly, the seal 7 cushions the element 5 to prevent it from contacting the lip 8 of the vessel 1 on its upper surface.

Thus, the element 5 becomes an integral part of the body of vessel 1 without actually touching the vessel 1 at any point. This is important if the vessel 1 is made of a plastics material such as polypropylene which is incapable of withstanding normal operating temperatures of the element 5.

Figure 7:
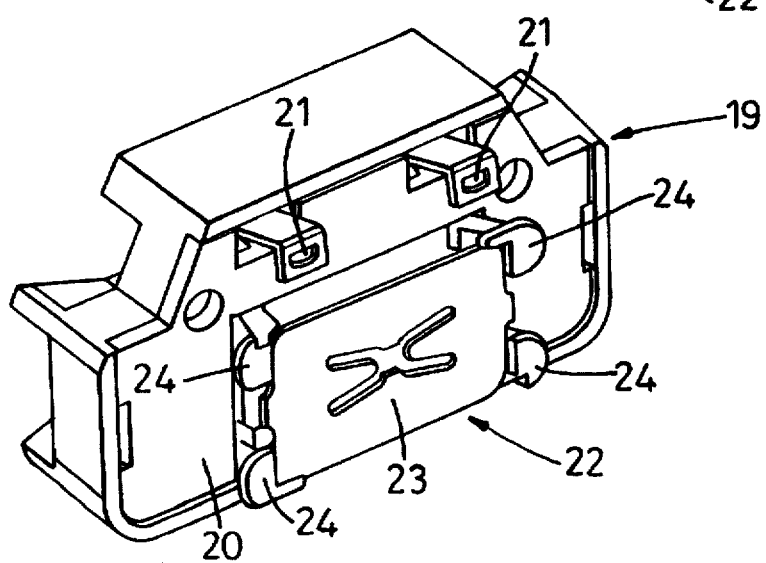
FIG. 7 is a perspective view showing in more detail the control means outlined in FIG. 6.

If the present invention is for use in a heating apparatus such as a domestic kettle, then the vessel 1 is typically made from polypropylene or a common metal and the normal operating temperature of the element will be in the range up to 120° C. with adverse temperatures significantly higher in the event of the kettle being operated without water or boiling dry. In these circumstances, the sealing means 7, 11, 12 or 13 can comprise silicone rubber, which will protect the body of the vessel 1 from the heat of the element 5 up to around 250° C. Likewise, the annulus 6 is preferably made of nylon, metal, or a thermoplastics material which will withstand the normal operating temperatures of the element 5 and, up to predetermined level, adverse temperatures too. However, the annulus 6 can fulfil the role of a thermal fuse for the heating apparatus and this and its other functions will now be described in more detail with reference to FIGS. 5, 6 and 7.

The annulus 6 is provided with three mounting posts 16 for the attachment of a base cover (not shown) to the vessel 1. The mounting posts 16 project from the inner diameter of the annulus 6, as shown in FIGS. 5 and 6 and as also shown schematically in FIG. 1. In addition, the annulus 6 is provided with two opposed projecting clips 17 supported by arms 18 and between which a thermostatic control means 19 can be snap-fitted. The clips 17, which have been omitted from FIG. 1, can be made integrally with the annulus 6 as shown in FIG. 6 or be attached thereto by a suitable means.

The control means 19 comprises a carrier 20 locating live and neutral connectors 21 and a boil-dry and thermal fuse means 22. The connectors 21 comprise leaf springs which in use are biased into contact with appropriately sited connectors (not shown) formed on the element 5. The boil dry and thermal fuse means 22 comprises a bi-stable, bi-metallic blade 23 which is mounted on four fusible feet 24 and is spring biases so that in use it can contact the element 5. It will be appreciated that as the connectors 21 and the blade 23 must contact the element 5, the size of the clips 17 is chosen so that the control means 19 is held firmly in position wherein the connectors 21 and the blade 23 can contact the element 5 against their respective biasing means.

In use, during normal operating temperatures of the element, the bi-stabel bi-metallic blade 23 is arranged so that it adopts a stable position in contact with the element 5 and thereby retains a switch (not shown) in the electrical supply circuit to the element 5 via the connectors 21 in a position which maintains the electrical supply. However, should the temperature of the element 5 rise above a normal operating range, for example in the case of a kettle if it should boil dry, then at a first predetermined temperature the blade 23 will switch into its other stable position and cause the switch to move into a position wherein the electrical supply to the element 5 is cut off. As soon as the temperature of the blade 23 drops below the first predetermined temperature then it will revert back to its original stable position to enable the electrical supply to be once more restored to the element 5.

However, as a back-up to the blade 23 in the event that it should fail to function correctly, then the feet 24 on which it is mounted are designed to melt if a second predetermined temperature higher than the aforosaid first predetermined temperature is reached. The control means 19 is designed so that should the feet 24 melt, this has the same effect as if the blade 23 had operated and the electrical supply through the connectors 21 is cut-off. Thus, the fusible feet 24 comprise a thermal fuse.

As yet a further back-up arrangement the annulus 6 is also designed to operate as a thermal fuse. Should for any reason the control means 19 fail to operate to cut-off the electrical supply to the element if its temperature rises above the second predetermined temperature, then at a third predetermined temperature higher than the second predetermined temperature either the annulus 6 itself or one or both clips 17 is designed to melt or buckle so that the clips 17 will be unable to retain the control means 19 firmly in position and it will fall away from the element 5 breaking the contract pressure between the connectors 21 and the respective connectors on the element 5.

The third predermined temperature can be set at an appropriate level dependent on the use to which the heating apparatus is to be put by manufacturing the annulus 6 and/or the clips 17 from an appropriate thermoplastic material such as a suitable plastics material, metal or, in the case of the clips 17, bi-metallic strips.

If the heating apparatus of the invention were, for example, to be kettle, then it will be appreciated that unlike a conventional kettle with a sheathed coiled wire electrical element which projects into the body of the kettle, the element 5 would be integrated into the body of the kettle, preferably in the base wall 2 of the kettle as shown in FIG. 3. However, in these circumstances it is preferable that instead of making the base wall 2 flat to lie horizontal in use, the base wall 2 surrounding the element 5 is inclined and made to slope towards the element 5. In this way, any water within the kettle is thereby directed on to the element 5. Thus, if it is desired to heat only a small quantity of water, the efficiency of the kettle is improved over that of a kettle with a substantially horizontal base wall because a greater proportion of the water will lie directly on the element 5 and not be trapped at the sides of the kettle. Indeed, conventional kettles are not able to cope with very small quantities of water without the danger of the element overheating so that kettle arrangement in accordance with this aspect of the present invention is a significant improvement.

As shown in FIGS. 3, the angle $\alpha$ of inclination of the base wall 2 of the vessel 1 to the horizontal is at least 5° and is preferably in the range 5° to 10° inclusive. In addition, the lip 8 provided on the base wall 2 steps the element 5 downwards from the base wall 2 to form a well at the bottom of the kettle. This improves the retention of small quantities of water in direct contact with the element 5 to improve the efficiency of the kettle.

Thus, the invention provides a means whereby a planar element such as an element of a thick film printed circuit type can be integrated in the body of a heating apparatus, such as kettle and in particular a plastics bodied kettle, to produce an apparatus which is more efficient than one incorporating a conventional sheathed coiled wire element and which takes advantage of all the improvements provided by more modern planar elements and their associated electrical control circuitry over conventional electrical elements.

However, it will be appreciated that the various aspects of the present invention can be used in connection with any heating apparatus used for heating liquids and not only in connection with water heating apparatus such as kettles. In addition, any suitable planar electrical element can be used in connection with the various aspects of the invention and not only those of a thick film printed circuit type.

What is claimed is:

1. A method of attaching a planar electrical heating element to a vessel whereby the heating element is integrated in the body of the vessel to form a heating apparatus, the vessel defining an aperture at a position where the heating element is to be secured thereto and the heating element comprises a plate capable of covering the aperture, the method comprising the steps of:

locating a seal around the periphery of the aperture;
    locating the heating element on the seal to cover the aperture;
    positioning a securing member on the heating element on the opposite side thereof to the seal;
    retaining the heating element and the securing member in position with the heating element in contact with the seal while compressing the seal by a predetermined amount; and
    deforming the body of the vessel in a region around said aperture to retain the securing member and thereby the heating element and the seal in place with the seal under compression.

2. A method as claimed in claim 1, wherein the body of the vessel is deformed by the application of heat to a portion of the body around the periphery of the aperture.

3. The method as claimed in claim 1, whereby the body of the vessel comprises a projecting collar around the periphery of the aperture which is deformed by being turned over inwardly of the aperture under the application of heat to come into contact with the securing member to retain the securing member and thereby the heating element and the seal in place with the seal under compression.

4. The method as claimed in claim 1, wherein the heating element and the securing member are retained in position with the heating element in contact with the seal while the seal is compressed, by supporting the securing member in contact with the element and applying a negative pressure to the interior of the vessel.

5. The method as claimed in claim 4, wherein the negative pressure is sufficient to compress the seal by the predetermined amount required.

6. The method as claimed in claim 1, wherein the heating element and the securing member are retained in position with the heating element in contact with the seal while the seal is compressed, by the application of pressure to the securing member.

7. The method as claimed in claim 1, wherein the securing member comprises an annulus.

8. The method as claimed in claim 7, wherein the annulus comprises at least one thermoplastic clip for attachment of a thermal switch thereto whereby in use at least part of the thermal switch is held in contact with the heating element.

9. The method as claimed in claim 1, wherein the seal comprises a silicone rubber seal which is compressed by at least 30%.

10. A heating apparatus comprising a vessel for heating liquid and a planar electrical heating element integrated in a body of the vessel, the heating element covering an aperture defined in the body of the vessel, the heating element being retained in position by deformation of the body of the vessel in a region around said aperture, a seal being located around the aperture between the heating element and the body of the vessel, and a securing member located in contact with the heating element on the opposite side thereof to the seal and against which a deformed portion of the body bears.

11. The apparatus as claimed in claim 10, wherein the body of the vessel comprises a projecting collar around a periphery of the aperture which is deformed by being turned over inwardly of the aperture to retain the heating element in place.

12. The apparatus as claimed in claim 11, wherein the projecting collar of the vessel is turned over into contact with the securing member to retain the heating element and the seal in place.

13. The apparatus as claimed in claim 10, wherein the seal is retained in position under compression.

14. The apparatus as claimed in claim 10, said vessel being a kettle, said body being made of a plastic material, a base wall of the vessel surrounding the heating element being inclined towards the heating element so that any liquid retained in the vessel is directed onto the heating element.

15. The apparatus as claimed in claim 14, wherein the base wall of the vessel surrounding the heating element is inclined towards the heating element at an angle of between 5° to 10° inclusive.

16. The apparatus as claimed in claim 14, wherein the heating element is stepped downwards from the base wall of the vessel to form a well in which liquid can be retained in direct contact with the heating element.

\* \* \* \* \*